UNITED STATES PATENT OFFICE.

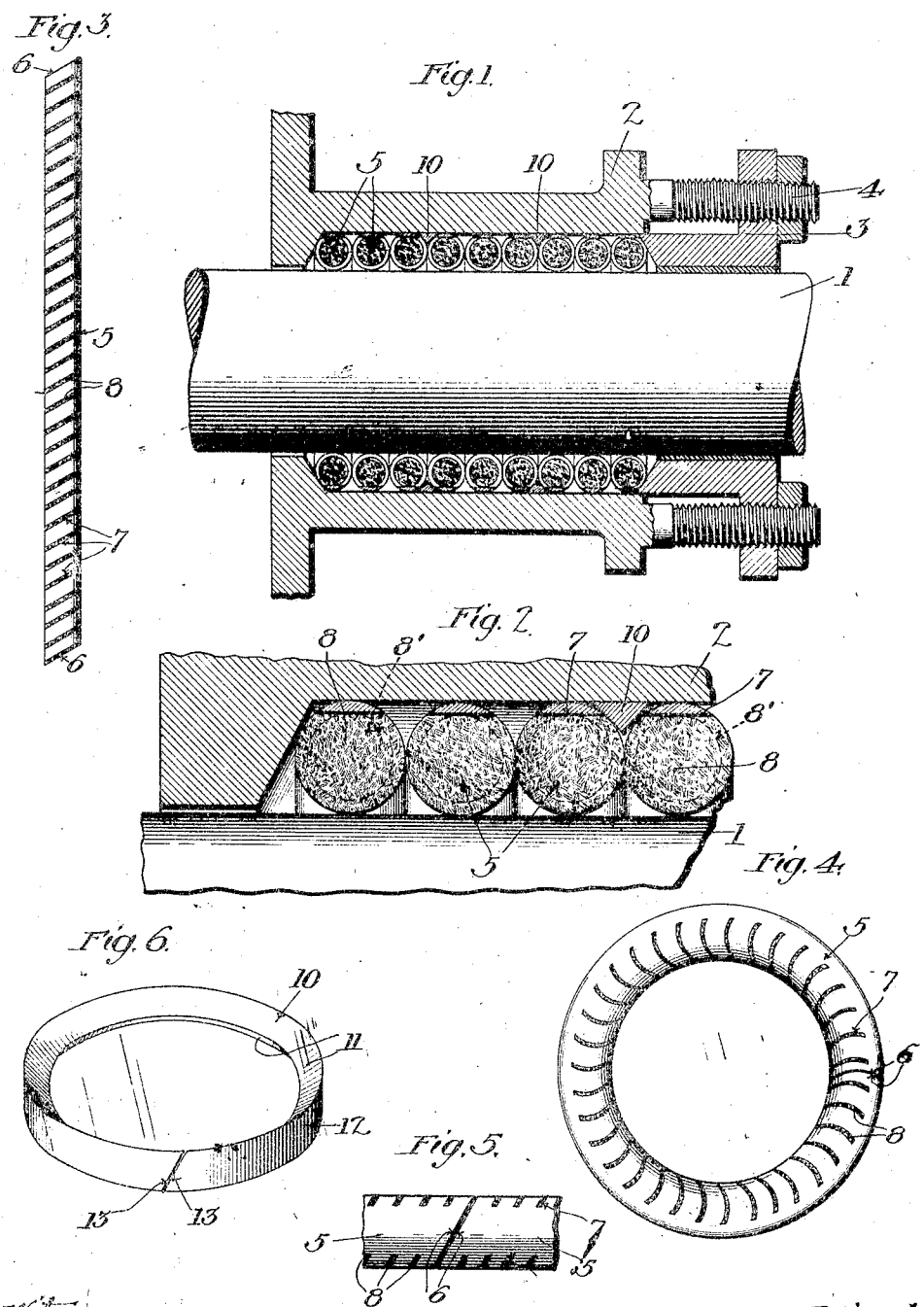

JOEL C. CHURCH, OF LOS ANGELES, CALIFORNIA.

ROD-PACKING.

1,006,436. Specification of Letters Patent. Patented Oct. 17, 1911.

Application filed January 3, 1911. Serial No. 600,637.

*To all whom it may concern:*

Be it known that I, JOEL C. CHURCH, a citizen of the United States, residing at Los Angeles, in the county of Los Angeles and State of California, have invented a new and useful Rod-Packing, of which the following is a specification.

The main object of the present invention is to provide an improved packing for piston rods for steam engines and pumps which will be durable and insure steam-tight joints.

The accompanying drawings illustrate the invention, and referring thereto:

Figure 1 is a longitudinal section of a stuffing box and rod showing the packing in place therein. Fig. 2 is an enlarged sectional view of a portion of the packing. Fig. 3 is a side elevation of the blank for the packing ring before it is bent to shape. Fig. 4 is a side elevation of the packing ring. Fig. 5 is a plan of a portion of the packing adjacent to the joint. Fig. 6 is a perspective of a wedging ring for the packing.

Referring to Fig. 1, the rod 1, which may be a piston rod, works through the stuffing box, comprising a cylindrical chamber 2 and packing means compressed within said chamber by the action of gland 3 operated by screw means 4. The inner ends of the chamber and of the gland are beveled to produce a wedging action on the packing.

The packing means comprises a series or plurality of rings 5, each ring being formed of a section of tubing, consisting of suitable antifriction metal, bent in annular shape with the ends 6 of the tube brought together to form a closed ring, said ends of the tubular section being preferably cut obliquely or diagonally to the axis of the tube to give a wedging joint. The tube is cut at one side as shown in Fig. 3 with a series of slits 7 which extend from one side of the tube nearly to the other side thereof so as to form openings extending through the wall of the tube from the inside to the outside of the tube and are preferably directed in planes oblique to the axis of the tube, said slits and the ends of the tube being, for example, cut parallel to one another when the tube is in straight condition, as shown in Fig. 3. The bore of the tube is filled with a more or less plastic antifriction and packing material 8 consisting, for example, of graphite mixed with finely divided antifriction metal, for example, the metal which has been removed to form the slits 7, this antifriction filling for the ring being forced into the ring in such manner as to occupy the bore 8' and the slits 7 and to extend flush with the surface of the tube, the said slits permitting the packing material to exude or pass from the interior of the tube to the outside thereof. The tube so formed is then bent into annular shape with the slits on the inside, as above described, and a series of such tubes is slipped into the chamber 2 of the stuffing box, said tubes extending side by side and in contact with one another and being of sufficient size to make contact on their outer faces with the inner wall of the chamber 2 and on their inner faces with the rod 1, the tightness of contact being determined by the pressure exerted on the tubes by the gland 3, it being understood that such pressure will cause more or less deformation of the packing rings, thereby increasing their superficial contact with the stuffing box chamber and the rod. When the rings are so placed, the plastic packing material 8 therein is brought into contact with the rod 1 serving as a lubricating packing. The oblique or diagonal arrangement of the slits 7 and the joint 6 insures complete closure by the series of packing rings, as it prevents a formation of any continuous channel from one end of the series to the other, such as might occur with slits extending straight across. This oblique or diagonal arrangement of the slits and joint also gives a wedging action by the pressure from the cylinder or when the parts are under compression by the gland 3, such wedging action further insuring tightness of the joints between the several parts.

If desired, auxiliary wedging means may be provided consisting of rings 10, see Fig. 6, said rings being beveled on their end faces, as shown at 11, so as to fit between the outer portions of the rings 5 and produce a wedging action thereon, the outer faces of said rings 12 fitting within chamber 2 and said rings being formed of strips bent into annular shape with the ends 13 obliquely or diagonally directed so as to give a wedging joint. Any desired number of these wedging rings may be interposed in the series of packing rings.

What I claim is:

1. A rod packing comprising a series of rings, each ring formed of a tube of antifriction metal slitted from the inside of the ring and having its ends abutting together, the ends of the tubes being obliquely cut to give a wedge joint, and packing material in said tubes and extending in said slits, said slits extending through the wall of the tube to enable the packing material to pass from the inside to the outside of the tube.

2. A rod packing comprising a series of rings, each ring formed of a tube of antifriction metal slitted from the inside of the ring and having its ends abutting together, the ends of the tubes being obliquely cut to give a wedge joint, and packing material in said tubes and extending in said slits, said slits being obliquely directed with reference to the axis of the tube and extending through the wall of the tube from the inside nearly to the outer side of the ring.

3. A packing ring element consisting of a tube of antifriction metal slitted from the inside of the ring and having its ends abutting together, the ends of the tubes being obliquely cut to give a wedge joint, and packing material in said tubes and extending in said slits, said slits being obliquely directed with reference to the axis of the tube and extending through the wall of the tube from the inside of the ring nearly to the outside thereof.

In testimony whereof, I have hereunto set my hand at Los Angeles, California, this 23rd day of December 1910.

JOEL C. CHURCH.

In presence of—
ARTHUR P. KNIGHT,
FRANK L. A. GRAHAM.